US009275662B2

(12) United States Patent
Isowaki et al.

(10) Patent No.: US 9,275,662 B2
(45) Date of Patent: Mar. 1, 2016

(54) MAGNETIC HEAD, MAGNETIC RECORDING AND REPRODUCING APPARATUS, AND METHOD OF MANUFACTURING MAGNETIC HEAD

(71) Applicant: KABUSHIKI KAISHA TOSHIBA, Tokyo (JP)

(72) Inventors: Yousuke Isowaki, Kanagawa (JP); Kenichiro Yamada, Tokyo (JP); Masayuki Takagishi, Tokyo (JP); Hitoshi Iwasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/642,980

(22) Filed: Mar. 10, 2015

(65) Prior Publication Data

US 2015/0269956 A1    Sep. 24, 2015

(30) Foreign Application Priority Data

Mar. 20, 2014 (JP) ................................. 2014-059048

(51) Int. Cl.
*G11B 5/39* (2006.01)

(52) U.S. Cl.
CPC .................... *G11B 5/3954* (2013.01)

(58) Field of Classification Search
CPC .. G11B 5/3912; G11B 5/3945; G11B 5/3948; G11B 5/3951; G11B 5/3954
USPC ................................................. 360/316, 322
See application file for complete search history.

(56) References Cited

U.S. PATENT DOCUMENTS

| 5,309,305 | A | 5/1994 | Nepela et al. | |
|---|---|---|---|---|
| 8,824,106 | B1* | 9/2014 | Garfunkel | G11B 5/2654 360/316 |
| 8,970,988 | B1* | 3/2015 | Li | G11B 5/2652 360/235.4 |
| 9,042,058 | B1* | 5/2015 | Li | G11B 5/3912 360/316 |
| 9,042,059 | B1* | 5/2015 | Katine | G11B 5/3909 360/316 |
| 9,087,527 | B1* | 7/2015 | Li | G11B 5/02 |
| 2003/0123198 | A1 | 7/2003 | Sugawara et al. | |
| 2015/0062735 | A1* | 3/2015 | Sapozhnikov | G11B 5/115 360/46 |
| 2015/0062755 | A1* | 3/2015 | Sapozhnikov | G11B 5/3951 360/235.4 |
| 2015/0243302 | A1* | 8/2015 | Kief | G11B 5/4853 360/245.8 |

FOREIGN PATENT DOCUMENTS

| JP | 6-215334 | 8/1994 |
|---|---|---|
| JP | 2003-069109 | 3/2003 |
| JP | 2008-084430 | 4/2008 |
| JP | 2010-135039 | 6/2010 |
| WO | WO 2010/067730 | 6/2010 |

* cited by examiner

*Primary Examiner* — Will J Klimowicz
(74) *Attorney, Agent, or Firm* — Nixon & Vanderhye, P.C.

(57) ABSTRACT

A magnetic head of an embodiment includes: a first electrode being a magnetic body having a magnetic shielding property; a first signal detector disposed on the first electrode and being a differential magnetoresistive effect element; a second electrode disposed on the first signal detector; an insulating layer disposed on the second electrode; a third electrode disposed on the insulating layer; a second signal detector disposed on the third electrode and being a differential magnetoresistive effect element; and a fourth electrode disposed on the second signal detector and being a magnetic body having a magnetic shielding property. At least one of the second electrode and the third electrode is a nonmagnetic metal.

19 Claims, 12 Drawing Sheets

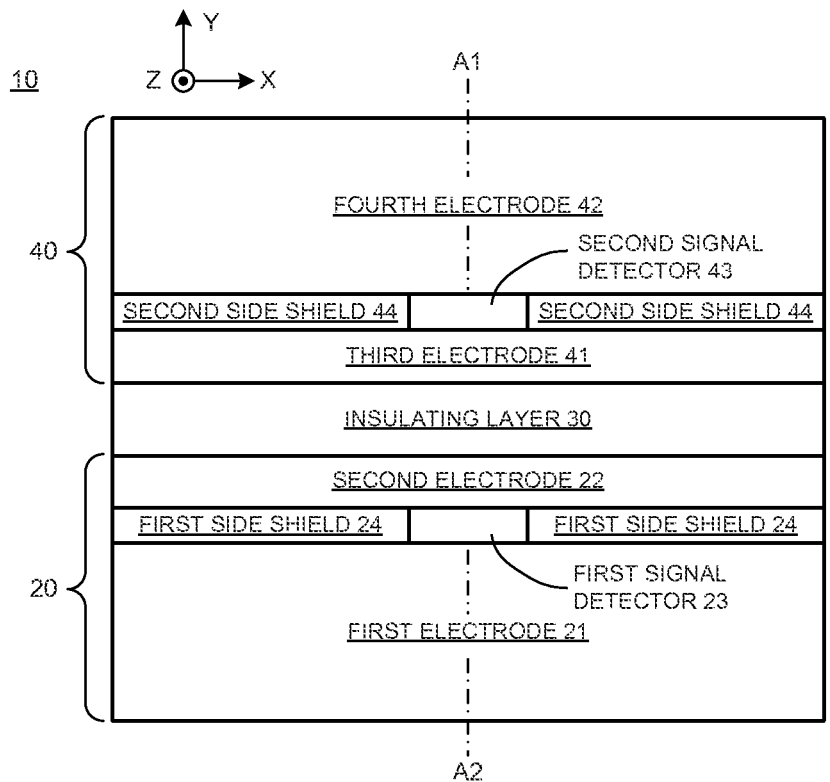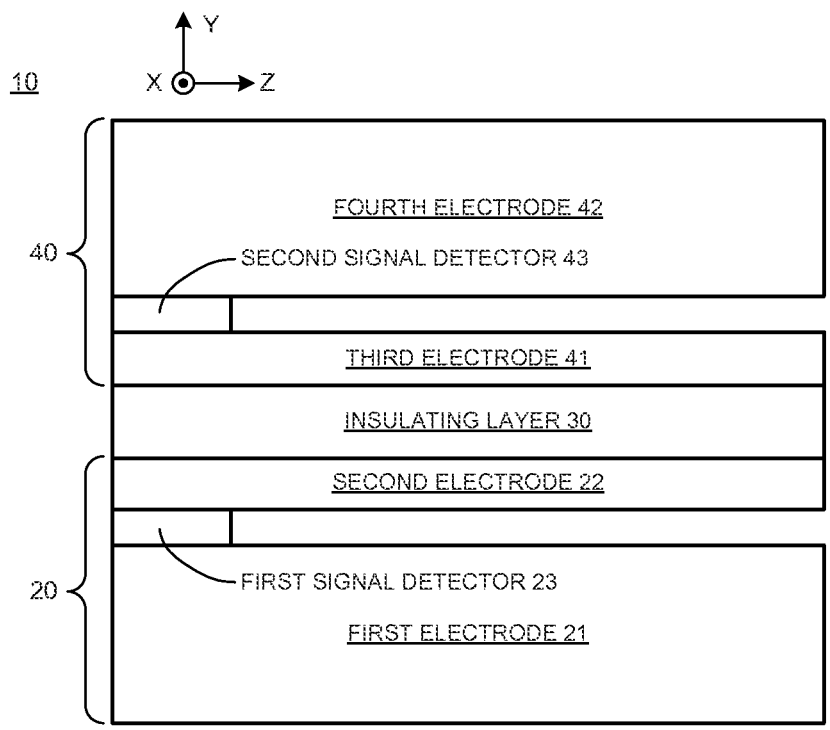

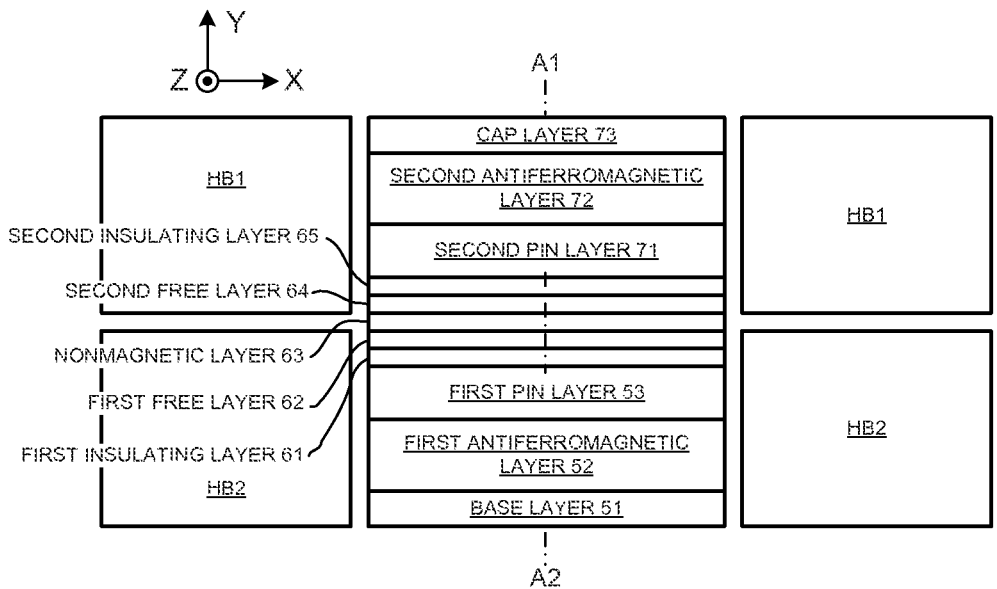
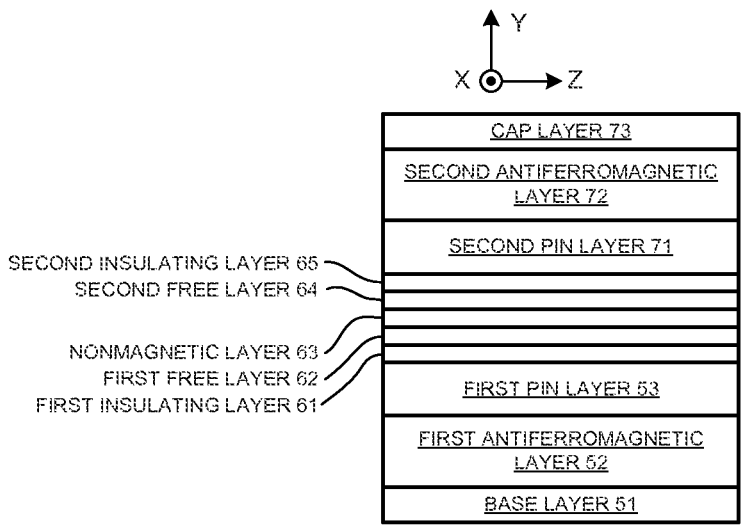

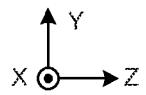
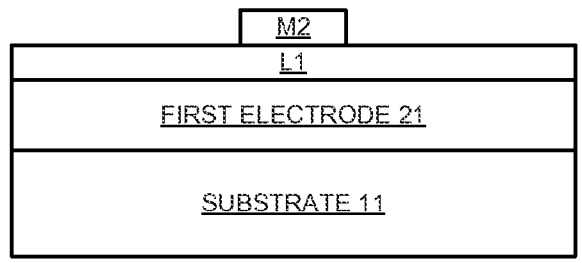
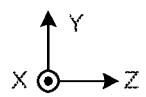
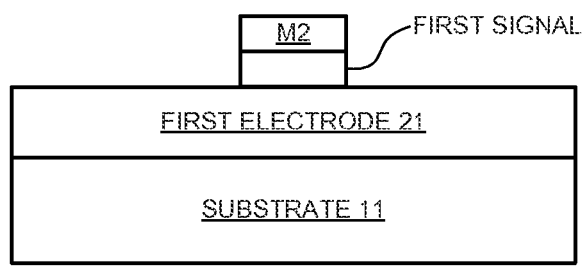
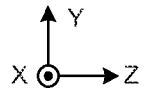
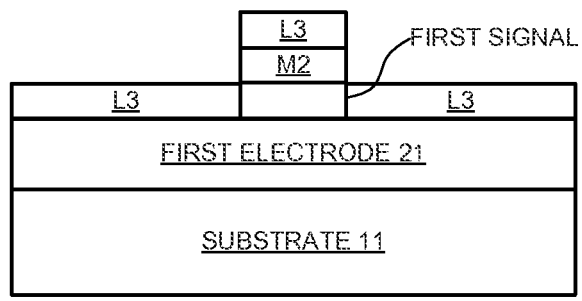
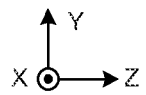
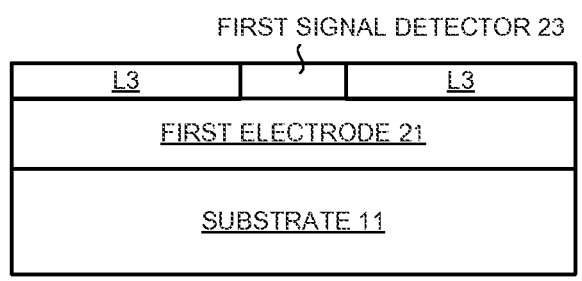

MAGNETIC HEAD, MAGNETIC RECORDING AND REPRODUCING APPARATUS, AND METHOD OF MANUFACTURING MAGNETIC HEAD

CROSS REFERENCE TO RELATED APPLICATION

This application is based upon and claims the benefit of priority from Japanese Patent Application No. 2014-059048, filed on Mar. 20, 2014; the entire contents of which are incorporated herein by reference.

FIELD

Embodiments described herein relate generally to a magnetic head, a magnetic recording and reproducing apparatus, and a method of manufacturing a magnetic head.

BACKGROUND

As a reproducing element of HDD (Hard Disk Drive) or the like, a magnetoresistive effect element is used. In HDD, a reduction of noise is required in addition to an improvement of reproducing resolution in order to improve recording density. For this purpose, a multi-magnetic head (multi-reproducing head) which is one magnetic head having a plurality of magnetoresistive effect elements mounted thereon has been investigated.

Such a multi-magnetic head makes it possible to integrate the same signal to be reproduced a plurality of times, thereby enabling a reduction of a white noise component. As a result, a high SNR (Signal Noise Ratio) is obtained, which makes it possible to improve the recording density.

Here, there is a possibility that the multi-magnetic head gets off-track due to skew. Specifically, when the magnetic head has an angle to a track, there is a possibility that one of the pair of the magnetoresistive effect elements deviates from a reproduction target track. This makes the reduction of the white noise difficult.

Accordingly, it is necessary to narrow an interval between the magnetoresistive effect elements so that the pair of magnetoresistive effect elements are on the same track even when the magnetic head has skew. Under such circumstances, thinning a magnetic shield electrode between the magnetoresistive effect elements has been investigated.

However, thinning the magnetic shield electrode leads to a deterioration of its shielding performance, making the magnetoresistive effect elements susceptible to an influence of external noise.

BRIEF DESCRIPTION OF THE DRAWINGS

FIG. 1A and FIG. 1B are schematic views illustrating a magnetic head according to a first embodiment.

FIG. 2A and FIG. 2B are schematic views illustrating an example of a differential magnetoresistive effect element.

FIG. 13 to FIG. 25 are schematic cross-sectional views illustrating an example of the magnetic head during the manufacture.

DETAILED DESCRIPTION

Figure 3A:
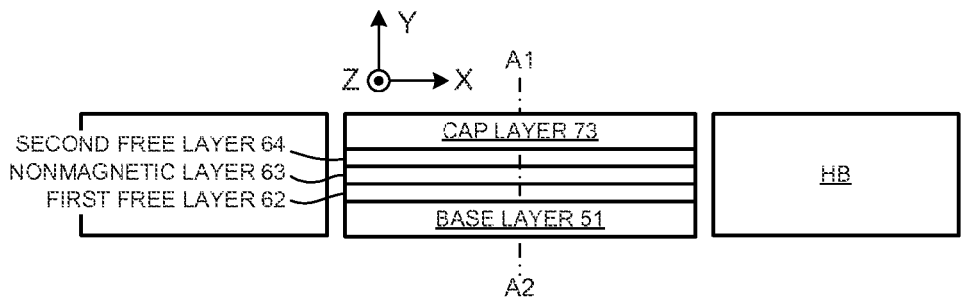
FIG. 3A and FIG. 3B are schematic views illustrating an example of the differential magnetoresistive effect element.

A magnetic head of an embodiment includes: a first electrode being a magnetic body having a magnetic shielding property; a first signal detector disposed on the first electrode and being a differential magnetoresistive effect element; a second electrode disposed on the first signal detector; an insulating layer disposed on the second electrode; a third electrode disposed on the insulating layer; a second signal detector disposed on the third electrode and being a differential magnetoresistive effect element; and a fourth electrode disposed on the second signal detector and being a magnetic body having a magnetic shielding property. At least one of the second electrode and the third electrode is a nonmagnetic metal.

Hereinafter, embodiments will be described in detail with reference to the drawings.

First Embodiment

FIG. 1A and FIG. 1B are schematic views illustrating an example of a multi-reproducing element 10 according to a first embodiment. FIG. 1A is a plane view of the multi-reproducing element (magnetic head) 10, and FIG. 1B is a cross-sectional view taken along A1-A2 line in FIG. 1A and illustrates a shape of the multi-reproducing element 10 in a depth direction of the sheet in FIG. 1A.

Here, the drawings are schematic or conceptual, and a relation between thickness and width of each part, a size ratio among the parts, and so on are not necessarily the same as actual ones. Further, even when the same part is illustrated, its size and ratio are sometimes differently depicted in the drawings.

Note that, in the description of the present application and the drawings below, the same elements as those previously described in a drawing already referred to are denoted by the same reference sings, and a detailed description thereof will be omitted when appropriate.

The multi-reproducing element 10 is mounted on, for example, a magnetic head (later-described magnetic head 93) of HDD (later-described magnetic recording and reproducing apparatus 90). Therefore, the plane view in FIG. 1A is a schematic view seen from, for example, a medium facing surface which faces a magnetic recording medium (later-described magnetic recording medium 91) mounted on the HDD. The cross-sectional view in FIG. 1B is a schematic view seen from, for example, a perpendicular direction to the magnetic recording medium facing surface.

As illustrated in FIG. 1A and FIG. 1B, the multi-reproducing element 10 includes a first reproducing element unit 20, an insulating layer 30, a second reproducing element unit 40, first side shields 24, and second side shields 44. The insulating layer 30 is provided between the first reproducing element unit 20 and the second reproducing element unit 40

The first reproducing element unit 20 includes a first electrode 21, a first signal detector 23, and a second electrode 22. The first signal detector 23 is provided between the first electrode 21 and the second electrode 22.

The second reproducing element unit 40 includes a third electrode 41, a second signal detector 43, and a fourth electrode 42. The second signal detector 43 is disposed between the third electrode 41 and the fourth electrode 42.

The first signal detector 23 and the second signal detector 43 are differential magnetoresistive effect elements. The differential magnetoresistive effect element will be described in detail later.

Here, if a direction from the first electrode 21 toward the fourth electrode 42 is defined as a Y-axis direction, the Y-axis direction is a film formation direction. A direction intersecting with the Y-axis direction and directed from the first signal detector 23 and the second signal detector 43 toward the first side shields 24 and the second side shields 44 is defined as an X-axis direction, and a direction intersecting with the Y-axis direction and intersecting also with the X-axis direction is defined as a Z-axis direction.

The first electrode 21, the second electrode 22, and the fourth electrode 42 are each made of a magnetic material. As this magnetic material, any of NiFe, CoZrTa, CoZrNb, CoZrNbTa, CoZrTaCr, and CoZrFeCr (hereinafter, referred to as "NiFe and so on") is usable, for instance. As the first electrode 21, the second electrode 22, and the fourth electrode 42, multilayer films each containing any of NiFe and so on may be used.

Note that the first electrode 21, the second electrode 22, and the fourth electrode 42 may have different magnetic materials or different stacked structures.

The first electrode 21, the second electrode 22, and the fourth electrode 42 each have a shielding function. The second electrode 22 is shared as a shield by the first reproducing element unit 20 and the second reproducing element unit 40, and magnetically separates the first reproducing element unit 20 and the second reproducing element unit 40. This can effectively prevent a reproduction signal from deteriorating due to an interaction between the first reproducing element unit 20 and the second reproducing element unit 40.

As will be described later, Y-axis direction resolution of the first signal detector 23 and the second signal detector 43 which are the differential magnetoresistive effect elements greatly depends not only on an inter-shield distance but also on a distance between two free layers (a first free layer 62 and a second free layer 64 which will be described later) that they each have. Therefore, the shielding function of the second electrode 22 need not be equal to those of the first electrode 21 and the fourth electrode 42. The shielding function of the second electrode 22 may be lower than the shielding functions of the first electrode 21 and the fourth electrode 42. That is, a thickness of the second electrode 22 (length of the second electrode 22 along the Y-axis direction) may be smaller than thicknesses of the first electrode 21 and the fourth electrode 42.

The thickness of the second electrode 22 is preferably not less than 10 nm nor more than 60 nm (more preferably not less than 20 nm nor more than 40 nm). When the film thickness is within these ranges, the shielding function of the second electrode 22 sensed by the first signal detector 23 and the second signal detector 43 can be optimized. In addition, it is possible to reduce surface irregularities of the third electrode 41 stacked on the second electrode 22 via the insulating layer 30. Consequently, crystallinity of the third electrode 41 also becomes good. As a result, it is possible to suppress an increase of a specific resistance of the third electrode 41 due to external factors such as the crystallinity and the surface irregularities.

Here, the film thickness of the second electrode 22 is defined as a distance along the Y-axis direction from an interface of its area in contact with the first signal detector 23 to its interface in contact with the insulating layer 30. By, for example, observing a cross section of the second electrode 22 by TEM (transmission electron microscope), it is possible to measure its film thickness.

Further, magnetization directions of the first electrode 21, the second electrode 22, and the fourth electrode 42 are directed in the X-axis direction when there is no applied magnetic field from the outside, that is, when they are in an initial state. Therefore, in each of the electrodes, an antiferromagnetic layer of IrMn or the like, for instance, may exists.

For the third electrode 41, a material smaller in specific resistance than the first electrode 21 and the fourth electrode 42 is used. The third electrode 41 is made of a nonmagnetic metal. As this nonmagnetic metal, any of Cu, Au, Ag, W, Mo, and Ru (hereinafter, referred to as "Cu and so on") is usable, for instance. As this nonmagnetic metal, an alloy of Cu and so on may be used. As the third electrode 41, a multilayer film containing any of Cu and so on may be used.

The use of any of these materials as the third electrode 41 makes it possible to reduce a film thickness of the third electrode 41 (length of the third electrode 41 along the Y-axis direction) while suppressing electromigration. As a result, reducing a distance between the first reproducing element unit 20 and the second reproducing element unit 40 is facilitated.

The film thickness of the third electrode 41 is preferably not less than 3 nm nor more than 20 nm (more preferably not less than 5 nm nor more than 10 nm). It is possible to maintain flatness of the third electrode 41 to suppress the electromigration ascribable to the specific resistance increase caused by the external factors such as the surface irregularities.

Incidentally, from a viewpoint of crystallinity of the second reproducing element unit 40, a layer serving as a base layer of the second reproducing element unit 40 may be used as the third electrode 41. Further, as the third electrode 41, the same material as that of the second electrode 22 may be stacked with a 10 nm thickness or less, for instance. As an example, NiFe (5 nm) may be stacked. This layer may have a shielding function or need not have the shielding function. Further, a two-layer film of Ta/Ru with 10 nm or less, for instance, may be used as this layer.

As the insulating layer 30, at least one of silicon oxide (for example, SiO2), silicon nitride, silicon oxynitride, aluminum oxide (for example, $Al_2O_3$), aluminum nitride, and aluminum oxynitride is usable.

A film thickness of the insulating layer 30 (length of the insulating layer 30 along the Y-axis direction) is preferably not less than 5 nm nor more than 40 nm. When the film thickness is within this range, it is possible to obtain a good electric insulating property between the first reproducing element unit 20 and the second reproducing element unit 40. In addition, it is possible to suppress the specific resistance of the third electrode 41 stacked on the insulating layer 30 from increasing due to the external factors such as the surface irregularities. This can suppress the electromigration of the third electrode 41.

The first side shields 24 and the second side shields 44 are each made of a magnetic material. As this magnetic material, any of NiFe, CoZrTa, CoZrNb, CoZrNbTa, CoZrTaCr, and CoZrFeCr (hereinafter, referred to as "NiFe and so on") is usable, for instance. As the first side shields 24 and the second side shields 44, multilayer films each containing any of NiFe and so on may be used.

The first side shields 24 and the second side shields 44 are exchange-coupled with the second electrode 22 and the fourth electrode 42 respectively. The exchange coupling includes, for example, direct bonding between a magnetic layer and a magnetic layer. For example, regarding a plurality of magnetic layers, the exchange coupling includes magnetic coupling between the plural magnetic layers acting via a very thin nonmagnetic layer provided between the plural magnetic layers. The exchange coupling is an effect via an interface between a magnetic layer and a magnetic layer or an interface between a magnetic layer and a nonmagnetic layer. When the exchange coupling is an effect via the interface between the magnetic layer and the nonmagnetic layer, the exchange coupling depends on a film thickness of the nonmagnetic layer and acts when the thickness of the nonmagnetic layer is 2 nm or less.

The exchange coupling is different from static field coupling caused by a leakage magnetic field from an end portion of the magnetic layer. In the exchange coupling, it is thought that a ferromagnetic coupling bias magnetic field (or an antiferromagnetic coupling bias magnetic field) acts between the magnetic layers. For example, when there is no applied magnetic field bias or the like from the outside, the magnetization directions of the magnetic layers are aligned in the same direction (ferromagnetic coupling state) or aligned in opposite directions (antiferromagnetic coupling state) due to this action of the exchange coupling.

When there is an applied magnetic field bias or the like from the outside, the magnetization is directed in a direction decided by the synthesis of the applied magnetic field bias magnetic field from the outside and the bias magnetic field ascribable to the exchange coupling. Therefore, when there is an applied magnetic field bias or the like from the outside, a ferromagnetic coupling bias magnetic field component due to the exchange coupling or an antiferromagnetic coupling magnetic field component acts. At this time, a direction of the bias magnetic field due to the exchange coupling does not necessarily agree with the direction of the magnetization between the magnetic layers.

In this embodiment, in the initial state of the first side shields 24 and the second side shields 44, that is, when there is no applied magnetic field from the outside, the magnetization direction is directed in the X-axis direction. The first side shields 24 and the second side shields 44 can be omitted. However, with the first side shields 24 and the second side shields 44, it is possible to improve reproducing resolution in the X-axis direction.

As each of the first signal detector 23 and the second signal detector 43, a differential magnetoresistive effect element is used. The differential magnetoresistive effect element is a magnetoresistive effect element which generates an output by reacting to a change of spatial magnetic field distribution. For example, in a case of a perpendicular magnetic recording HDD, in an ordinary TMR (tunnel magnetoresistance) element, an output is generated according to a magnetization direction of each recording bit, and the maximum output is obtained at a position of the recording bit. On the other hand, in a case of the differential magnetoresistive effect element, it generates an output by reacting to a transition area where a magnetization direction of a recording bit changes, and the maximum output is obtained at a position of the bit transition area.

FIG. 2A to FIG. 4B illustrate examples of the signal detector used in this embodiment and illustrates three kinds of differential magnetoresistive effect elements.

FIG. 2A illustrates an example of the differential magnetoresistive effect element. FIG. 2B is a cross-sectional view taken along A1-A2 line in FIG. 2A and illustrates its shape in a depth direction of the sheet in FIG. 2A. This magnetoresistive effect element has a base layer 51, a first antiferromagnetic layer 52, a first pin layer 53, a first insulating layer 61, a first free layer 62, a nonmagnetic layer 63, a second free layer 64, a second insulating layer 65, a second pin layer 71, a second antiferromagnetic layer 72, a cap layer 73, and hard biases HB (HB2, HB2).

The base layer 51 is intended to reduce an influence of contamination or the like from an adhesion surface of the MR element and to improve a crystal orientation property of a film formed on the base layer 51. As the base layer 51, Ta, NiCr, FeNi, Ta/NiCr, or the like is usable, for instance. A film thickness of the base layer 51 can be 1 m to 4 m, for instance.

The first antiferromagnetic layer 52 and the second antiferromagnetic layer 72 are each made of an antiferromagnetic material. As this antiferromagnetic material, IrMn, PtMn, or the like is usable, for instance. A film thickness of each of the first antiferromagnetic layer 52 and the second antiferromagnetic layer 72 can be 5 nm to 15 nm, for instance.

The first pin layer (first magnetic fixing layer) 53 and the second pin layer (second magnetic fixing layer) 71 each is made of a ferromagnetic material, and has a magnetization direction which is fixed. As this ferromagnetic material, CoFe, CoFeB, or NiFe is usable, or a stacked structure in which Ru is sandwiched by the combination of two out of these (for example, CoFe/Ru/CoFe or the like) is usable, for instance. A film thickness of each of the first pin layer 53 and the second pin layer 71 can be 1 nm to 10 nm, for instance.

As the first insulating layer 61, MgO, AlO (Al oxide layer), or TiO (Ti oxide layer) is usable, for instance. A film thickness of the first insulating layer 61 can be 1 nm to 2 nm, for instance.

As each of the first free layer (first magnetic free layer) 62 and the second free layer (second magnetic free layer) 64, CoFe, CoFeB, NiFe, or the like is usable, for instance, and has a magnetization direction which is changeable by external magnetic field. A film thickness of each of the first free layer (first magnetic free layer) 62 and the second free layer (second magnetic free layer) 64 can be 2 nm to 6 nm, for instance.

Further, as the nonmagnetic layer 63, Cu, Ru, or the like is usable, for instance. A film thickness of the nonmagnetic layer 63 can be 0.3 nm to 10 nm, for instance.

As the cap layer 73, Cu, Ru, Ta, or the like is usable, for instance. A film thickness of the cap layer 73 can be 1 nm to 5 nm, for instance.

The hard biases HB1, HB2 correspond to the first free layer (first magnetic free layer) 62 and the second free layer (second magnetic free layer) 64 respectively. As each of the hard biases HB1, HB2, CoPt is usable, for instance. Magnetization directions of the hard biases HB1, HB2 are the X-axis direction. Film thicknesses of the hard biases HB1, HB2 are appropriately adjusted according to magnitudes of magnetic fields applied to the first free layer (first magnetic free layer) 62 and the second free layer (second magnetic free layer) 64. The film thickness of each of the hard biases HB1, HB2 can be 5 nm to 15 nm, for instance.

Between the hard biases HB1, HB2, thin nonmagnetic metals (for example, 1 nm Ru or Pt) may be inserted to antiferromagnetically couple them. Alternatively, between the hard biases HB1, HB2, thin insulating layers (for example, 2 nm $Al_2O_3$) may be inserted. Alternatively, the hard biases HB1, HB2 may be directly bonded with each other. Between the hard biases HB1, HB2 and the stack (the base layer 51, the first antiferromagnetic layer 52, the first pin layer 53, the first insulating layer 61, the first free layer 62, the nonmagnetic layer 63, the second free layer 64, the second insulating layer 65, the second pin layer 71, the second antiferromagnetic layer 72, and the cap layer 73), thin insulating layers (for example, 2 nm $Al_2O_3$) are inserted to insulate them from each other.

Figure 3B:
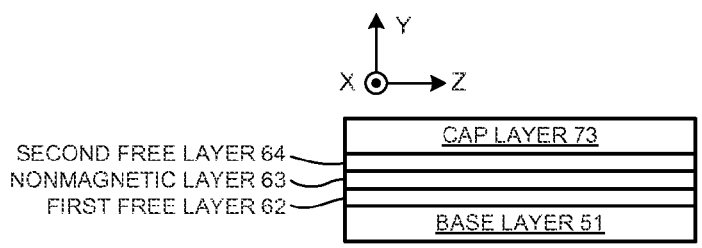

FIG. 3A illustrates another example of the differential magnetoresistive effect element. FIG. 3B is a cross-sectional view taken along A1-A2 line in FIG. 3A and illustrates its shape in a depth direction of the sheet in FIG. 3A. This magnetoresistive effect element has a base layer 51, a first free layer 62, a nonmagnetic layer 63, a second free layer 64, a cap layer 73, and hard biases HB.

As constituent materials and film thicknesses of the first free layer 62, the nonmagnetic layer 63, and the second free layer 64, the same ones as those in FIG. 2A and FIG. 2B are usable. Further, as each of the first free layer 62 and the second free layer 64, CoFeMnSi, CoMnSi, CoFeMnGe, CoMnGe, CoFeAlSi, CoFeGeGa, or the like is usable, for instance. The film thickness of each of the first free layer 62 and the second free layer 64 can be 2 nm to 6 nm, for instance.

As the nonmagnetic layer 63, Cu, Ag, MgO, AlO, TiO, or the like is usable, for instance. The film thickness of the nonmagnetic layer 63 can be 1 nm to 10 nm, for instance.

Constituent materials and film thicknesses of the base layer 51, the cap layer 73, and the hard biases HB illustrated in FIG. 3A and FIG. 3B are the same as those in FIG. 2A and FIG. 2B, and therefore, a description thereof will be omitted.

Figure 4A:
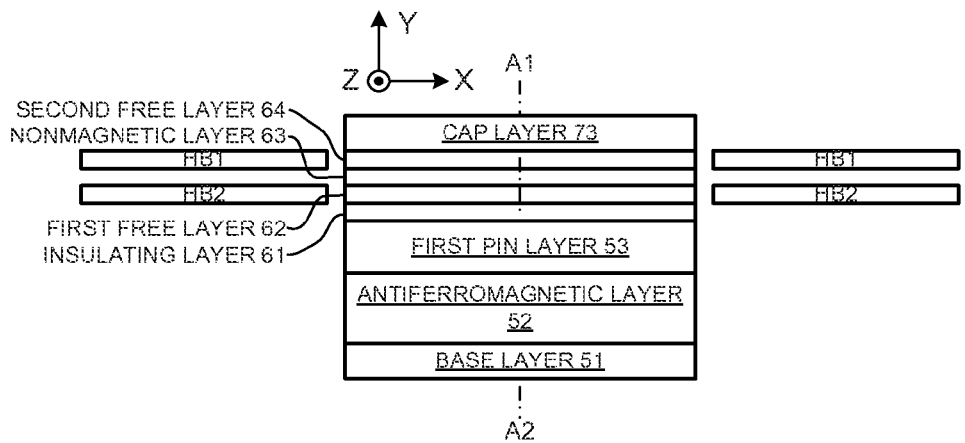
FIG. 4A and FIG. 4B are schematic views illustrating an example of the differential magnetoresistive effect element.
Figure 4B:
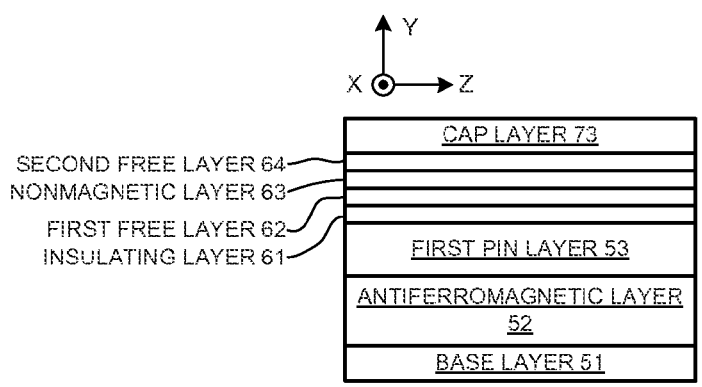

FIG. 4A illustrates another example of the differential magnetoresistive effect element. FIG. 4B is a cross-sectional view taken along A1-A2 line in FIG. 4A and illustrates its shape in a depth direction of the sheet in FIG. 4A. This magnetoresistive effect element has a base layer 51, a first antiferromagnetic layer 52, a first pin layer 53, a first insulating layer 61, a first free layer 62, a nonmagnetic layer 63, a second free layer 64, a cap layer 73, and hard biases HB.

As a constituent material and a film thickness of the nonmagnetic layer 63, the same ones as those in FIG. 2A and FIG. 2B can be used. However, for example, a stacked structure of very thin Ru and a magnetic layer (for example, [Ru (0.4 nm)/CoFe (1 nm)]n (n is the number of times of the stacking)) can be used. This makes it possible to adjust a distance between the first free layer 62 and the second free layer 64, that is, adjust resolution.

FIG. 2A to FIG. 4A all illustrate the differential magnetoresistive effect element, and they exhibit the same output characteristic, but they each have its own structural characteristic regarding the number of the included antiferromagnetic layers. For example, the structure in FIG. 2A has the two antiferromagnetic layers (the first antiferromagnetic layer 52, the second antiferromagnetic layer 72) per one magnetoresistive effect element. The structure in FIG. 3A has no antiferromagnetic layer, and the structure in FIG. 4A includes one antiferromagnetic layer (the antiferromagnetic layer 52). The smaller the number of the antiferromagnetic layers that the magnetoresistive effect element has, the higher its manufacturing easiness.

Constituent materials and film thicknesses of the base layer 51, the first antiferromagnetic layer 52, the first pin layer 53, the first insulating layer 61, the first free layer 62, the second free layer 64, the cap layer 73, and the hard biases HB1, HB2 illustrated in FIG. 4A and FIG. 4B are the same as those in FIG. 2A and FIG. 2B, and therefore a description thereof will be omitted.

At least one of the first signal detector 23 and the second signal detector 43 is used, for instance. The first signal detector 23 and the second signal detector 43 need not be differential magnetoresistive effect elements having the same structure. Differential magnetoresistive effect elements with different structures may be combined.

The hard biases HB (HB1, HB2) are illustrated in FIG. 2A, FIG. 3A, and FIG. 4A, but the presence/absence of the hard biases HB is selected according to the presence/absence of the first side shields 24 and the second side shields 44. Specifically, for example, when the first side shields 24 are omitted, the hard biases HB are used in the first signal detector 23 illustrated in any of FIG. 2A, FIG. 3A, and FIG. 4A. For example, when the second side shields 44 are omitted, the hard biases HB are provided in the second signal detector 43 illustrated in any of FIG. 2A, FIG. 3A, and FIG. 4A. Further, for example, when the first side shields 24 are provided, the hard biases HB are omitted in the first signal detector 23 illustrated in any of FIG. 2A, FIG. 3A, and FIG. 4A.

As illustrated in FIG. 2A to FIG. 4B, the differential magnetoresistive effect element generally has the first free layer 62, the nonmagnetic layer 63, and the second free layer 64. Its resolution depends on the distance between the magnetic shields sandwiching the differential magnetoresistive effect element from above and from under and the distance between the two free layers (the first free layer 62, the second free layer 64). The Y-axis direction resolution of the magnetoresistive effect element of the differential output greatly depends especially on the distance between the first free layer 62 and the second free layer 64.

Further, since a differential signal is generated between the first free layer 62 and the second free layer 64, external noise with a relatively low frequency applied both to the first free layer 62 and the second free layer 64 is easily canceled. That is, the differential magnetoresistive effect element is relatively strong against noise.

According to this embodiment, it is possible to reduce white noise until a skew angle θ becomes large while maintaining high reproducing resolution. That is, a high SNR can be obtained. Consequently, increasing recording density is facilitated.

This is because it is possible to thin the third electrode 41 and the second electrode 22 to reduce the distance between the first signal detector 23 and the second signal detector 43 and accordingly an influence of skew is small, as will be described below. That is, as the third electrode 41, a nonmagnetic metal with not less than 3 nm nor more than 20 nm can be used, without the third electrode 41 being intended to function as a shield.

Further, the second electrode 22 preferably has a certain degree of a shielding property, but a magnetic metal with not less than 10 nm nor more than 60 nm can be used as the second electrode 22.

Since the first signal detector 23 and the second signal detector 43 are both of differential magnetoresistive effect elements, their resolutions in the Y-axis direction greatly depend especially on the distance between the first free layer 62 and the second free layer 64. Further, the removal of noise with a relatively low frequency is facilitated in each of these. As a result, a firm magnetic shield is not necessary between the first signal detector 23 and the second signal detector 43.

As described above, since the first signal detector 23 and the second signal detector 43 are differential magnetoresistive effect elements, the thinning of the third electrode 41 and the second electrode 22 is facilitated, which makes it possible to reduce the influence of skew.

Comparative Example

Figure 5:
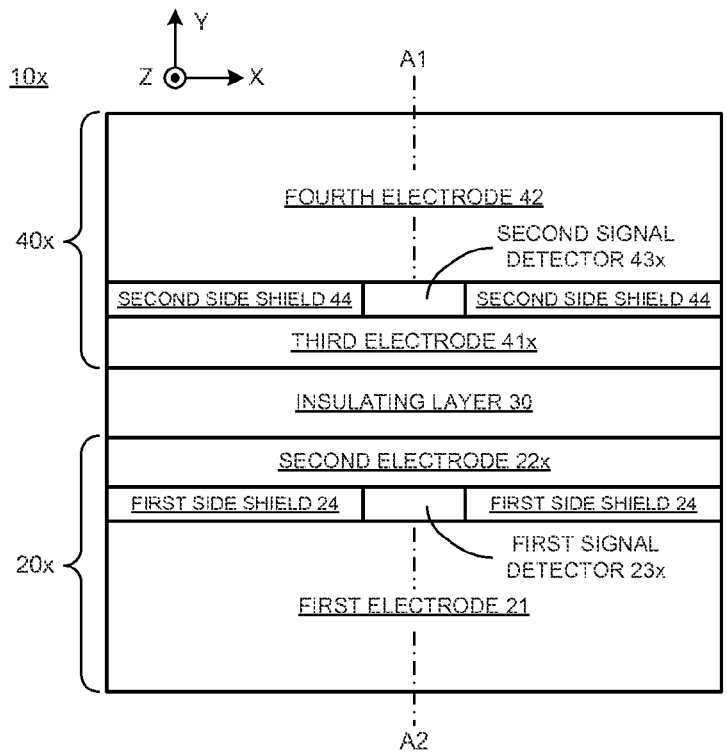
FIG. 5 is a schematic view illustrating a magnetic head according to a comparative example.

FIG. 5 is a schematic view illustrating a multi-reproducing element (magnetic head) 10x according to a comparative example. As illustrated in FIG. 5, the multi-reproducing element 10x includes a first reproducing element unit 20x, an insulating layer 30, a second reproducing element unit 40x, first side shields 24, and second side shields 44.

The first reproducing element unit 20x includes a first electrode 21, a first signal detector 23x, and a second electrode 22x.

The second reproducing element unit 40x includes a third electrode 41x, a second signal detector 43x, and a fourth electrode 42.

Here, the first signal detector 23x and the second signal detector 43x are non-differential magnetoresistive effect elements (for example, a TMR type).

Further, all of the first electrode 21, the second electrode 22x, the third electrode 41x, and the fourth electrode 42 are magnetic bodies and have a magnetic shielding function. That is, since the first signal detector 23x and the second signal detector 43x are non-differential magnetoresistive effect elements, they are susceptible to an influence of external noise, and the second electrode 22x and the third electrode 41x are both required to have a magnetic shielding function. This necessitates thickening both the second electrode 22x and the third electrode 41x, resulting in an increase of an interval between the first signal detector 23x and the second signal detector 43x. As a result, the multi-reproducing element (magnetic head) 10x is susceptible to an influence of skew.

Figure 6:
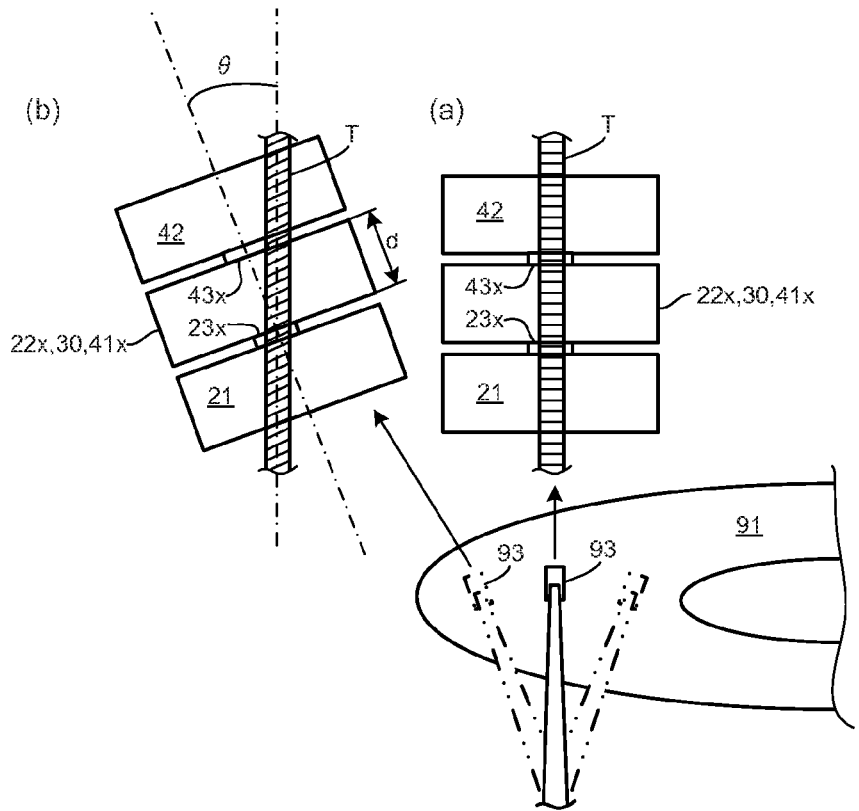
FIG. 6 is a schematic view illustrating skew of a magnetic head.

As illustrated in FIG. 6, it is assumed that the magnetic head 93 reads information of a track T on the magnetic recording medium 91. At this time, when the track T is located close to an inner periphery or close to an outer periphery of the magnetic recording medium 91, the magnetic head 93 has an angle (skew angle) θ to the track T.

(Occurrence of Skew)

(a), (b) in FIG. 6 illustrate cases where there is skew and there is no skew respectively. In the case of the presence of the skew, if an interval d between the first signal detector 23x and the second signal detector 43x is large, the track T read by the first signal detector 23x and the track T read by the second signal detector 43x do not agree with each other. At this time, it becomes difficult to reduce a white noise component by integrating the same signal to be reproduced a plurality of times.

On the other hand, in the first embodiment, it is possible to thin the second electrode 22 and the third electrode 41. As a result, an interval between the first signal detector 23 and the second signal detector 43 becomes small, and even when there is skew, a possibility of the occurrence of off-track becomes low. That is, the tracks read by the first signal detector 23 and the second signal detector 43 easily agree with each other. As a result, it becomes easy to reduce the white noise component by integrating the same signal to be reproduced a plurality of times.

Second Embodiment

Figure 7A:
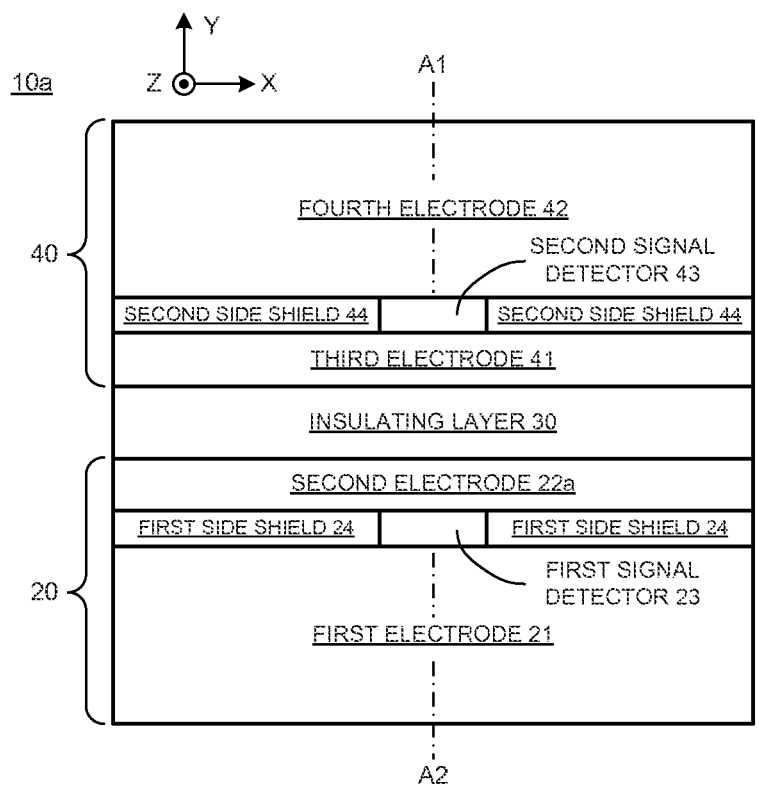
FIG. 7A and FIG. 7B are schematic views illustrating a magnetic head according to a second embodiment.
Figure 7B:
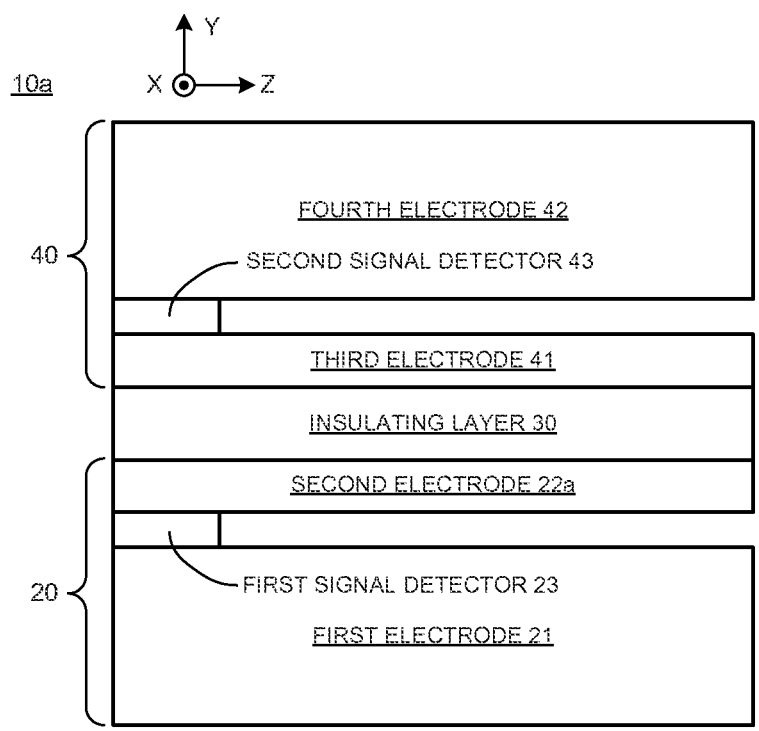

FIG. 7A and FIG. 7B are schematic views illustrating an example of a multi-reproducing element 10a according to a second embodiment. FIG. 7A is a plane view, and FIG. 7B is a cross-sectional view taken along A1-A2 line in FIG. 7A and illustrates its shape in a depth direction of the sheet in FIG. 7A. The multi-reproducing element 10a is mounted on, for example, a magnetic head of HDD. Therefore, the plane view in FIG. 7A is a schematic view seen from a medium facing surface which faces a magnetic recording medium mounted on the HDD, for instance. The cross-sectional view in FIG. 7B is a schematic view of the shape in, for example, a direction perpendicular to the magnetic recording medium facing surface.

As illustrated in FIG. 7A and FIG. 7B, the multi-reproducing element 10a includes a first reproducing element unit 20, an insulating layer 30, and a second reproducing element unit 40.

The first reproducing element unit 20 includes a first electrode 21, a first signal detector 23, and a second electrode 22a. The first signal detector 23 is provided between the first electrode 21 and the second electrode 22a.

The second reproducing element unit 40 includes a third electrode 41, a second signal detector 43, and a fourth electrode 42. The second signal detector 43 is provided between the third electrode 41 and the fourth electrode 42.

Here, if a direction from the first electrode 21 toward the fourth electrode 42 is defined as a Y-axis direction, the Y-axis direction is a film formation direction. In FIG. 7A, a direction intersecting with the Y-axis direction and parallel to the sheet is defined as an X-axis direction, and a direction intersecting with the Y-axis direction and intersecting also with the X-axis direction is defined as a Z-axis direction.

In the first embodiment, the second electrode 22 is made of the magnetic material, but in this embodiment, the second electrode 22a is made of a nonmagnetic material. That is, in this embodiment, the second electrode 22a and the third electrode 41 are both made of nonmagnetic metals.

As the second electrode 22a, a material smaller in specific resistance than the first electrode 21 and the fourth electrode 42 is used. The second electrode 22a is made of the nonmagnetic metal. As this nonmagnetic metal, any of Cu, Au, Ag, W, Mo, and Ru (hereinafter, referred to as "Cu and so on") is usable, for instance. As this nonmagnetic metal, an alloy of Cu and so on may be used. As the second electrode 22a, a multilayer film containing any of Cu and so on may be used.

Using any of these materials as the second electrode 22a makes it possible to reduce a film thickness of the second electrode 22a (length of the second electrode 22a along the Y-axis direction) while suppressing electromigration. As a result, it is possible to further reduce a distance between the first reproducing element unit 20 and the second reproducing element unit 40.

The film thickness of the second electrode 22a is preferably not less than 3 nm nor more than 20 nm (more preferably not less than 5 nm nor more than 10 nm). It is possible to maintain flatness of the second electrode 22a to suppress the electromigration ascribable to an increase of a specific resistance caused by external factors such as surface irregularities.

Incidentally, as the second electrode 22a, the same material as that of the first electrode 21 may be stacked with 10 nm or less. For example, NiFe (10 nm) may be stacked. At this time, the second electrode 22a may have a shielding function or need not have a shielding function.

First side shields 24 and second side shields 44 need not be provided as in the first embodiment. When the first side shields 24 are provided, a stack of the aforesaid nonmagnetic metal and NiFe is used as the second electrode 22a, for instance. At this time, NiFe is stacked on a first side shield 24 side.

As the first signal detector 23 and the second signal detector 43, differential magnetoresistive effect elements are used. As each of the first signal detector 23 and the second signal detector 43, any of the differential magnetoresistive effect element illustrated in FIG. 2A, FIG. 2B, FIG. 3A, FIG. 3B, FIG. 4A, and FIG. 4B is used, for instance. As the other material conditions (material, film thickness, shape), the same ones as those in the first embodiment are usable.

According to this embodiment, since the second electrode 22a can be further thinned, it is possible to reduce white noise until a skew angle θ becomes larger while maintaining high reproducing resolution. That is, a higher SNR can be obtained. Consequently, recording density can be increased.

Third Embodiment

Figure 8A:
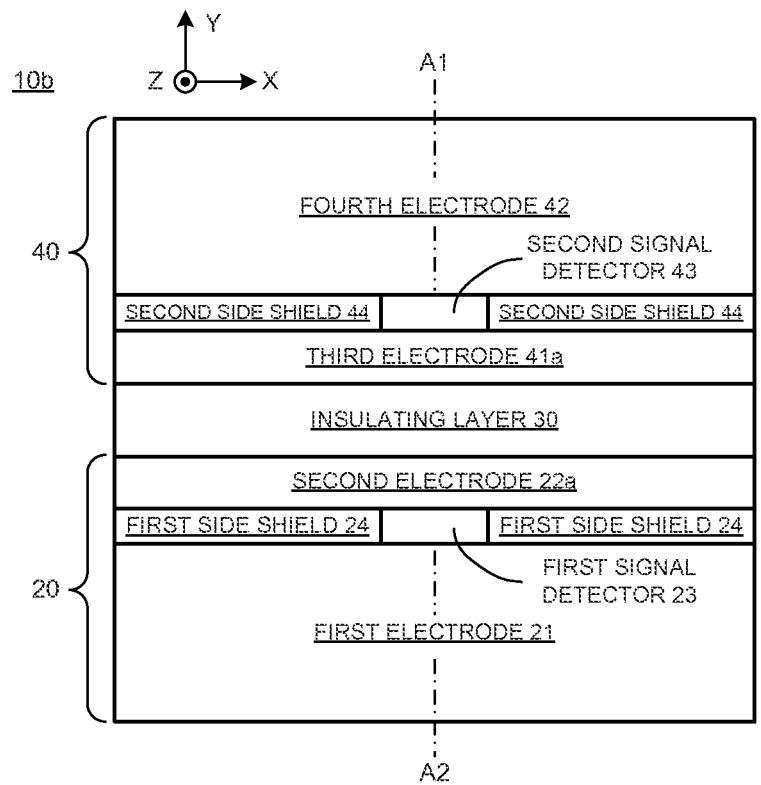
FIG. 8A and FIG. 8B are schematic views illustrating a magnetic head according to a third embodiment.
Figure 8B:
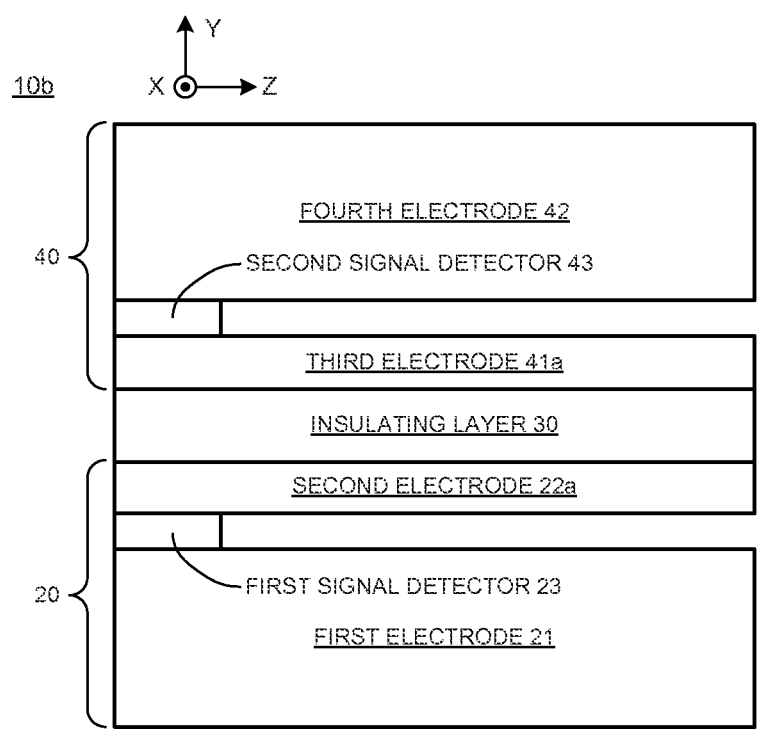

FIG. 8A and FIG. 8B are schematic views illustrating an example of a multi-reproducing element 10b according to a third embodiment. FIG. 8A is a plane view, and FIG. 8B is a cross-sectional view taken along A1-A2 line in FIG. 8A and illustrates its shape in a depth direction of the sheet in FIG. 8A. The multi-reproducing element 10b is mounted on, for example, a magnetic head of HDD. Therefore, the plane view in FIG. 8A is a schematic view seen from, for example, a medium facing surface which faces a magnetic recording medium mounted on the HDD. The cross-sectional view in FIG. 8B is a schematic view of the shape in, for example, a direction perpendicular to the magnetic recording medium facing surface.

As illustrated in FIG. 8A and FIG. 8B, the multi-reproducing element 10b includes a first reproducing element unit 20, an insulating layer 30, and a second reproducing element unit 40.

The first reproducing element unit 20 includes a first electrode 21, a first signal detector 23, and a second electrode 22a. The first signal detector 23 is provided between the first electrode 21 and the second electrode 22a.

The second reproducing element unit 40 includes a third electrode 41a, a second signal detector 43, and a fourth electrode 42. The second signal detector 43 is provided between the third electrode 41a and the fourth electrode 42.

Here, if a direction from the first electrode 21 toward the fourth electrode 42 is defined as a Y-axis direction, the Y-axis direction is a film formation direction. In FIG. 8A, a direction intersecting with the Y-axis direction and parallel to the sheet is defined as an X-axis direction, and a direction intersecting with the Y-axis direction and intersecting also with the X-axis direction is defined as a Z-axis direction.

In the second embodiment, the third electrode 41 is made of the nonmagnetic material, but in this embodiment, the third electrode 41a is made of a magnetic material. That is, in this embodiment, the second electrode 22a is made of a nonmagnetic material, and the third electrode 41a is made of the magnetic material.

The third electrode 41a is made of the magnetic material. As this magnetic material, any of NiFe, CoZrTa, CoZrNb, CoZrNbTa, and CoZrFeCr (hereinafter, referred to as "NiFe and so on") is usable, for instance. As the third electrode 41a, a multilayer film containing any of NiFe and so on may be used.

The third electrode 41a has a shielding function. The third electrode 41a is shared as a shield by the first reproducing element unit 20 and the second reproducing element unit 40, and magnetically separates the first reproducing element unit 20 and the second reproducing element unit 40. This can effectively prevent a reproduction signal from deteriorating due to an interaction between the first reproducing element unit 20 and the second reproducing element unit 40.

As previously described, Y-axis direction resolution of the first signal detector 23 and the second signal detector 43 which are differential magnetoresistive effect elements greatly depends not only on an inter-shield distance but also on a distance between two free layers that they each have. Therefore, the shielding function of the third electrode 41a need not be equal to those of the first electrode 21 and the fourth electrode 42. The shielding function of the third electrode 41a may be lower than the shielding functions of the first electrode 21 and the fourth electrode 42. That is, a thickness of the third electrode 41a (length of the third electrode 41a along the Y-axis direction) may be smaller than thicknesses of the first electrode 21 and the fourth electrode 42.

The thickness of the third electrode 41a is preferably not less than 10 nm nor more than 60 nm (more preferably not less than 20 nm nor more than 40 nm). When the film thickness is within these ranges, the shielding function of the third electrode 41a sensed by the first signal detector 23 and the second signal detector 43 can be optimized.

Here, the film thickness of the third electrode 41a is defined as a distance along the Y-axis direction from an interface of its area in contact with the second signal detector 43 to its interface in contact with the insulating layer 30. By, for example, observing a cross section of the third electrode 41a by TEM (transmission electron microscope), it is possible to measure its film thickness.

Further, magnetization directions of the first electrode 21, the third electrode 41a, and the fourth electrode 42 are directed in the X-axis direction when there is no applied magnetic field from the outside, that is, when they are in an initial state. Therefore, in each of the electrodes, an antiferromagnetic layer of IrMn or the like, for instance, may exists.

As the other material conditions (material, film thickness, shape), the same ones as those in the first embodiment and the second embodiment are used.

Fourth Embodiment

Figure 9:
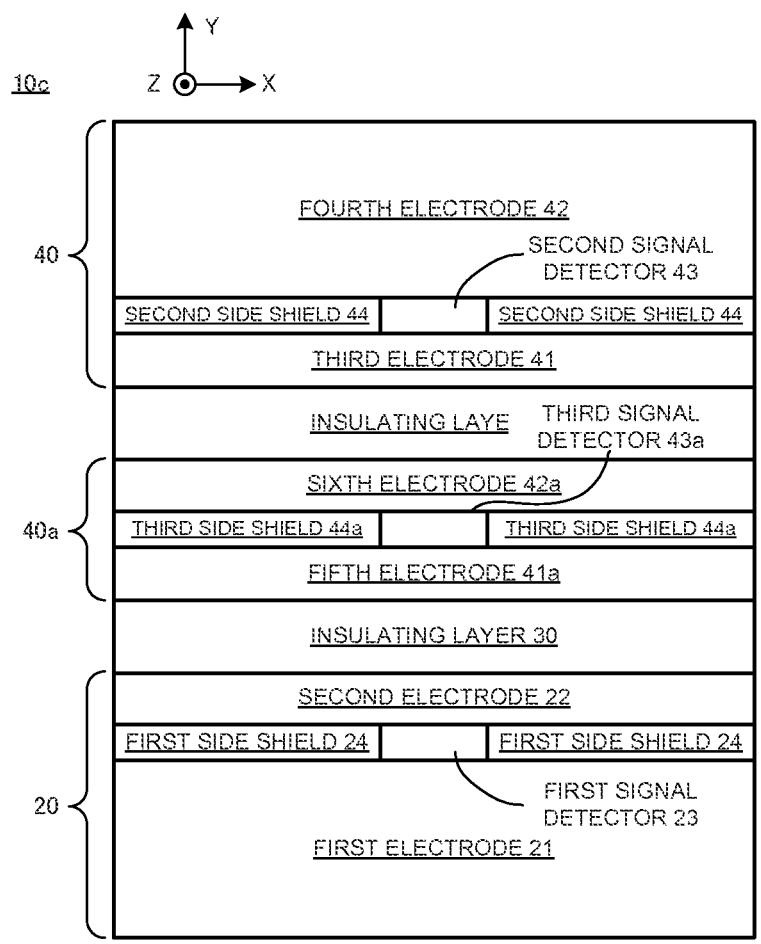
FIG. 9 is a schematic view illustrating a magnetic head according to a fourth embodiment.

FIG. 9 is a schematic view illustrating an example of a multi-reproducing element 10c according to a fourth embodiment. FIG. 9 is a plane view corresponding to FIG. 1A.

As illustrated in FIG. 9, the multi-reproducing element 10c includes a first reproducing element unit 20, insulating layers 30, 31, a second reproducing element unit 40, and a third reproducing element unit 40a. The third reproducing element unit 40a and the insulating layer 31 are disposed between the insulating layer 30 and the second reproducing element unit 40. The third reproducing element unit 40a includes a fifth electrode 41a, a third signal detector 43a, and a sixth electrode 42a. The third signal detector 43a is provided between the fifth electrode 41a and the sixth electrode 42a.

The multi-reproducing element 10c has the three reproducing element units (first, second, and third reproducing element units 20, 40, 40a) and is capable of sequentially reproducing the same track by the three reproducing element units. By integrating three reproduction signals, it is possible to more reduce a white noise component as compared with a case where two reproduction signals are integrated.

Incidentally, a reproducing element unit and an insulating layer may be further provided between the insulating layer 30 and the second reproducing element unit 40 so that the multi-reproducing element has four reproducing element units. In this case, four reproduction signals are integrated, which can further reduce a white noise component.

Fifth Embodiment

Figure 10:
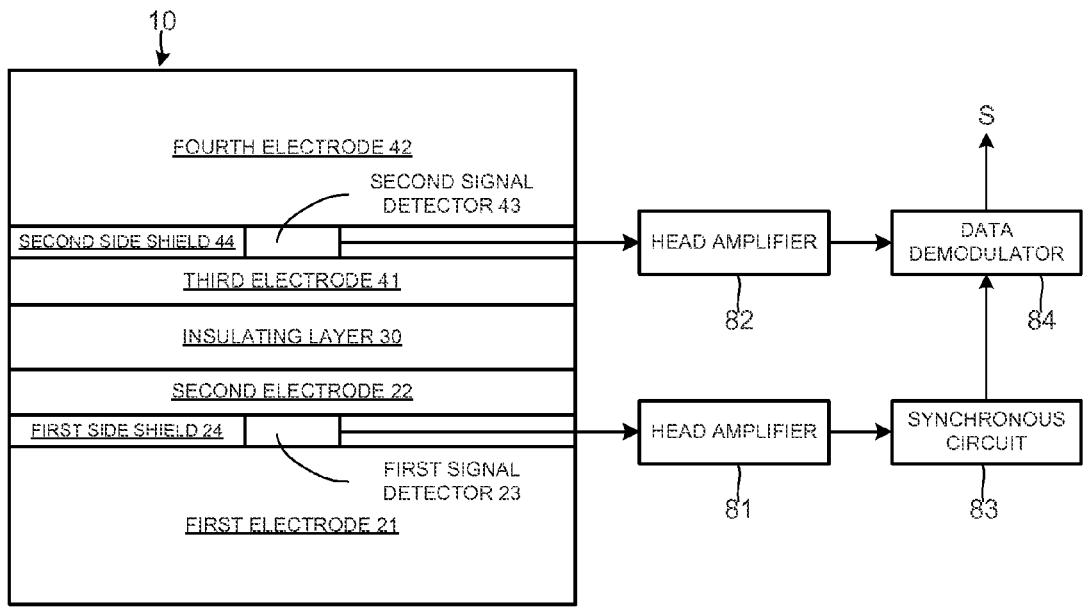
FIG. 10 is a block diagram illustrating an example of a signal computing unit.

FIG. 10 is a block diagram illustrating an example of a signal computing unit that a magnetic recording and reproducing apparatus according to a fifth embodiment has. As illustrated in FIG. 10, output signals of the first signal detector 23 and the second signal detector 43 of the multi-reproducing element 10 are amplified in head amplifiers 81, 82 respectively. An output signal of the head amplifier 81 is input to a synchronous circuit 83. This output signal, after being cached in the synchronous circuit 83, is input to a data modulator 84 at a predetermined timing as, for example, an in-phase combined signal with an output signal of the head amplifier 82, so that a read signal S is obtained.

Thus, by using the output signals of the first signal detector 23 and the second signal detector 43, it is possible to obtain the read signal S whose white noise component is reduced.

In the magnetic recording and reproducing apparatus according to the fifth embodiment, the output signals of the first signal detector 23 and the second signal detector 43 of the multi-reproducing element 10 undergo the combination processing, whereby the read signal S can be obtained. FIG. 10 merely illustrates an example of the signal computing unit. For example, after the output signal of the first signal detector 23 is input to the synchronous circuit 83 and the combined signal with the output signal of the second signal detector 43 is generated, the combined signal may be amplified in the head amplifier 81 to be input to the data modulator 84.

Sixth Embodiment

Figure 11:
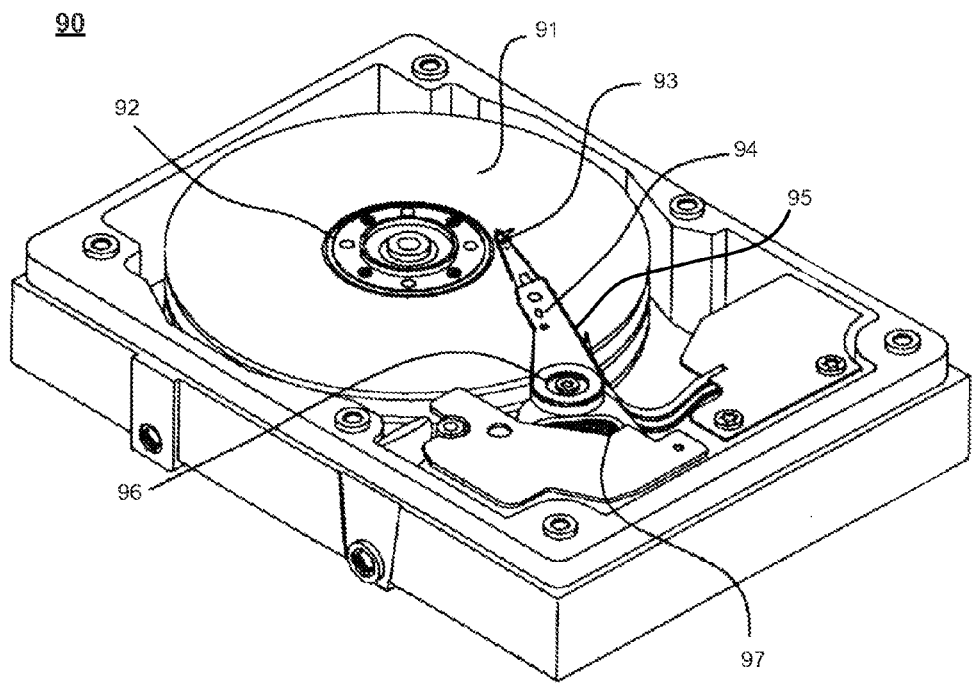
FIG. 11 is a schematic view illustrating an example of a magnetic recording and reproducing apparatus.

FIG. 11 is a view illustrating the magnetic recording and reproducing apparatus (HDD apparatus) 90 according to a sixth embodiment. The magnetic recording and reproducing apparatus 90 has the magnetic recording medium 91, a spindle motor 92, and the magnetic head 93. As the magnetic head 93, any of the multi-reproducing elements 10 to 10c is used. Further, the head amplifiers 81, 82, the synchronous circuit 83, and the data modulator 84 which are illustrated in FIG. 10 are provided.

The magnetic recording and reproducing apparatus 90 is an apparatus of a type using a rotary actuator. The magnetic recording medium 91 is mounted on the spindle motor 92 and rotates by a motor (not illustrated) that responds to a control signal from a drive control unit (not illustrated).

When the magnetic recording medium 91 rotates, a pressing pressure by a suspension 94 and a pressure generated in a medium facing surface (also called ABS) of a head slider balance with each other. As a result, the medium facing surface (magnetic head 93) of the head slider is held with a predetermined floating amount from a surface of the magnetic recording medium 91.

The suspension 94 is connected to one end of an actuator arm 95 having a bobbin portion holding a drive coil (not illustrated), and so on. A voice coil motor 97 which is a kind of a linear motor is provided at the other end of the actuator arm 95. The voice coil motor 97 can be composed of the drive coil (not illustrated) taken up by the bobbin portion of the actuator arm 95 and a magnetic circuit composed of a permanent magnet and a counter yoke which are disposed so as to face each other to sandwich the coil.

The actuator arm 95 is held by ball bearings (not illustrated) provided at two upper and lower places of a bearing part 96 and is capable of rotationally sliding by the voice coil motor 97. As a result, it is possible to move the magnetic recording head to a desired position of the magnetic recording medium 91.

In the multi-reproducing elements according to the first to fourth embodiments and the multi-reproducing elements mounted in the fifth and sixth embodiments which are described above, a deviation in the X-axis direction between the first signal detector 23 and the second signal detector 43 is preferably −10 nm to +10 nm (more preferably, −5 nm to +5 nm). When the deviation is within this range, it is possible to reduce white noise until a skew angle θ becomes large.

(Manufacturing Method)

A method of manufacturing a magnetic head will be described.

Figure 12:
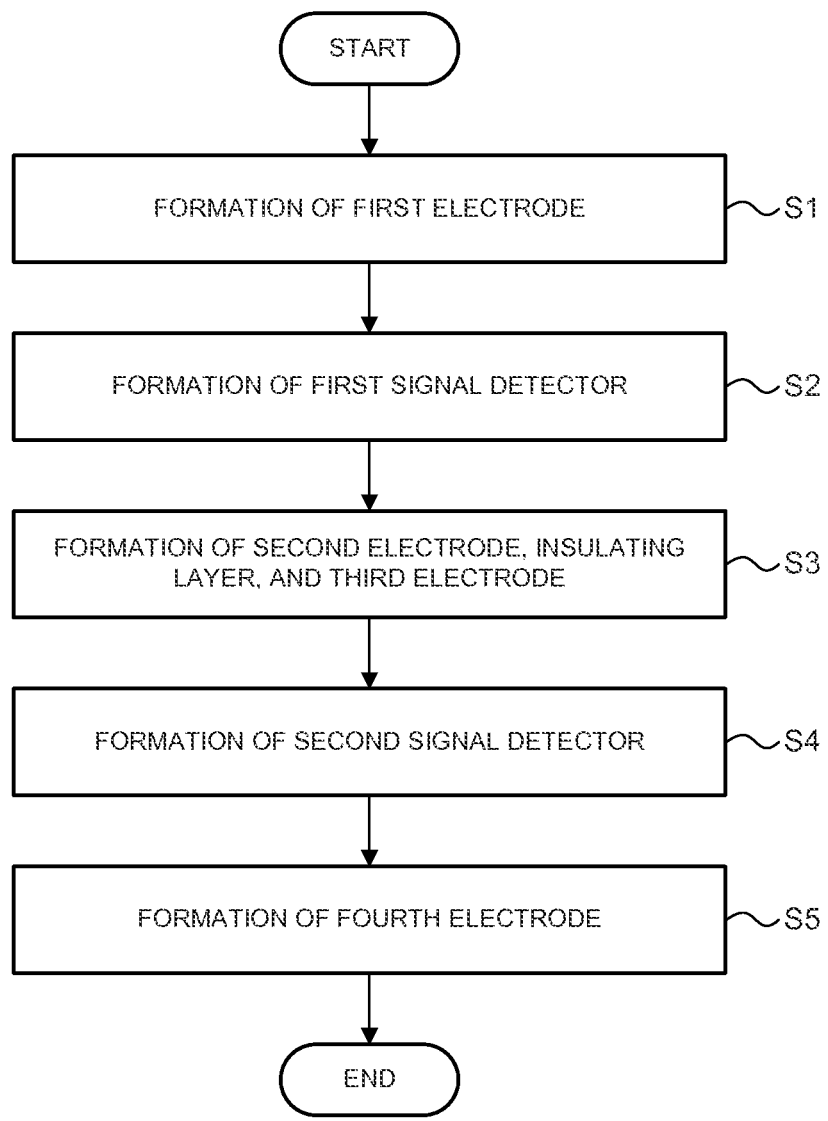
FIG. 12 is a flowchart illustrating an example of a method of manufacturing the magnetic head.

FIG. 12 is a flowchart illustrating the method of manufacturing the magnetic head. FIG. 13 to FIG. 25 illustrate schematic cross-sectional views of an example of the magnetic head during the manufacture. Here, the method of manufacturing the magnetic head of the first embodiment is illustrated. FIG. 13 to FIG. 18 correspond to FIG. 1A, and FIG. 19 to FIG. 22 correspond to FIG. 1B.

Figure 13:
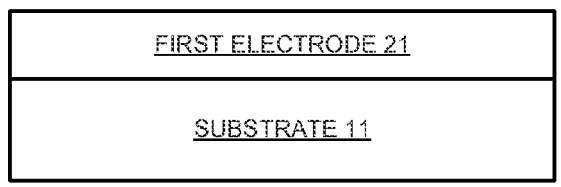

(1) Formation of First Electrode 21 (Step S1, Refer to FIG. 13)

As illustrated in FIG. 13, the first electrode 21 (electrode layer) is formed on a substrate 11. After a deposit (metal layer) being a material of the first electrode 21 is formed on the substrate 11 by, for example, electroplating, its surface is polished. Irregularities of the surface of the metal layer are flattened by, for example, a chemical mechanical polishing (CMP) method. The constituent material of the first electrode 21 is, for example, NiFe. The thickness of the first electrode 21 in the Y-axis direction is, for example, 1 μm.

Thereafter, the substrate 11 is carried into a chamber (not illustrated). A pressure in the chamber is reduced (for example, to vacuum), and an upper surface of the first electrode 21 is etched by ion beams. Consequently, an oxide layer and a contamination layer formed on the upper surface of the first electrode 21 are removed. The oxide layer is, for example, a layer adhering during manufacturing processes.

(2) Formation of First Signal Detector 23 (Step S2, Refer to FIG. 14 to FIG. 22)

Figure 14:
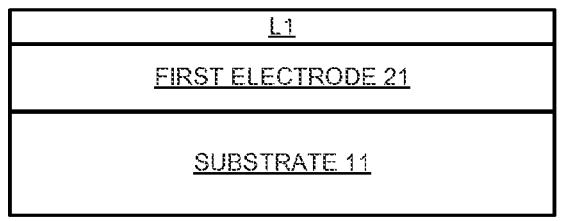

As illustrated in FIG. 14, while the pressure in the chamber is kept reduced, a film stack L1 which will be the first signal detector 23 is formed on the first electrode 21 by, for example, sputtering. The first signal detector 23 is, for example, the differential magnetoresistive effect element illustrated in FIG. 4A and FIG. 4B, and includes the base layer 51, the antiferromagnetic layer 52, the insulating layer 61, the first free layer 62, the second free layer 64, the cap layer (nonmagnetic layer) 73, and so on. The Y-axis direction thickness of the whole film stack L1 (first signal detector 23) is, for example, 26 nm.

Figure 15:
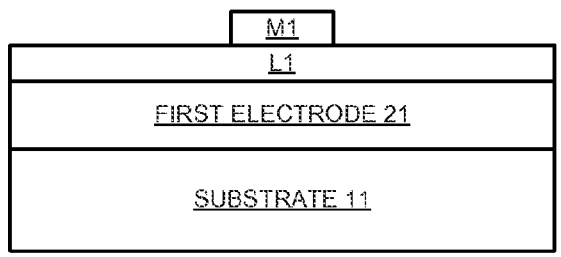

As illustrated in FIG. 15, on the film stack L1 which will be the first signal detector 23, a mask pattern M1 is formed. As the mask pattern M1, a resist mask or a metal mask containing Ta is used, for instance. The mask pattern M1 is formed by using, for example, a photolithography technique. A shape of an upper surface of the mask pattern M1 defines an X-axis direction width of the film stack L1 which will be the first signal detector 23. This width is, for example, 35 nm.

Figure 16:
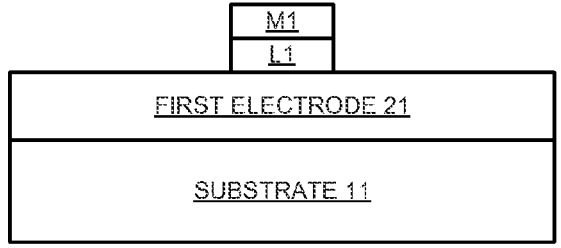

As illustrated in FIG. 16, by using the mask pattern M1 as a mask, the film stack L1 which will be the first signal detector 23 is etched by, for example, ion beam etching. As a result, a partial pattern of the film stack L1 which will be the first signal detector 23 is formed.

Figure 17:
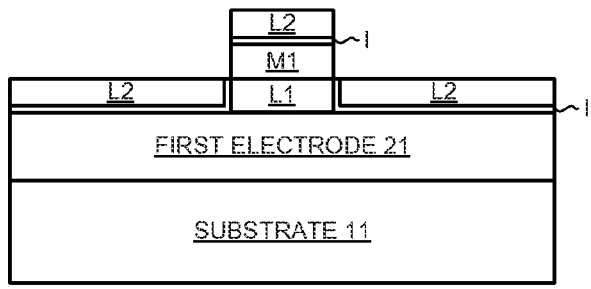

As illustrated in FIG. 17, after an insulating film I is stacked on the mask pattern M1 and the first electrode 21, a film L2 which will be the first side shields 24 is stacked. The insulating film I is to prevent current passage to the first side shields 24, and is made of, for example, $Al_2O_3$. A Y-axis direction thickness of the insulating film I is, for example, 3 nm. A material of the film of the first side shields 24 is, for example, NiFe. A Y-axis direction thickness of the film L2 which will be the first side shields 24 is set so that the film L2 fills etched regions, for instance.

Note that in FIG. 17, the mask pattern M1 is depicted in a simplified manner for easier understanding, but the mask pattern M1 is actually under-cut. Therefore, the insulating film I and the film L2 are not formed on side surfaces of the mask pattern M1.

Figure 18:
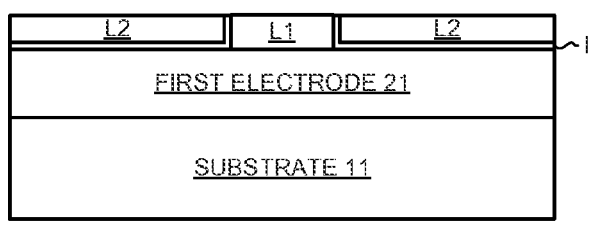

As illustrated in FIG. 18, the mask pattern M1, and the insulating film I and the film L2 which are on the mask pattern M1 are removed by, for example, a liftoff method. Thereafter, flattening by CMP or the like is performed so that upper surfaces of the film L2 which will be the first side shields 24 and the film stack L1 which will be the first signal detector 23 becomes flush with each other.

Next, the shape seen from FIG. 1B is fabricated. As illustrated in FIG. 19, on the film stack L1, which will be the first signal detector 23, that is patterned in the X-axis direction, a mask pattern M2 is stacked as in FIG. 15. This is different from FIG. 15 in that an upper surface shape of the mask pattern M2 defines a width in the Z-axis direction.

As illustrated in FIG. 20, by using the mask pattern M2 as a mask, the first signal detector 23 is formed by ion beam etching or the like.

As illustrated in FIG. 21, an insulating film L3 made of, for example, $Al_2O_3$ is stacked on the mask pattern M2 and the first electrode 21. In some case, a Y-axis direction thickness of the insulating layer L3 is sometimes set so that it fills etched regions, or in some other case, this thickness is set to about 3 nm and a hard bias layer, that is, a magnetic layer is stacked thereon. FIG. 21 illustrates the case where the insulating film L3 is stacked so as to fill the etched regions.

As illustrated in FIG. 22, the mask pattern M2 and the insulating film L3 on the mask pattern M2 are removed by liftoff. Thereafter, flattening by CMP or the like is performed so that upper surfaces of the insulating layer L3 and the first signal detector 23 are flush with each other.

Figure 23:
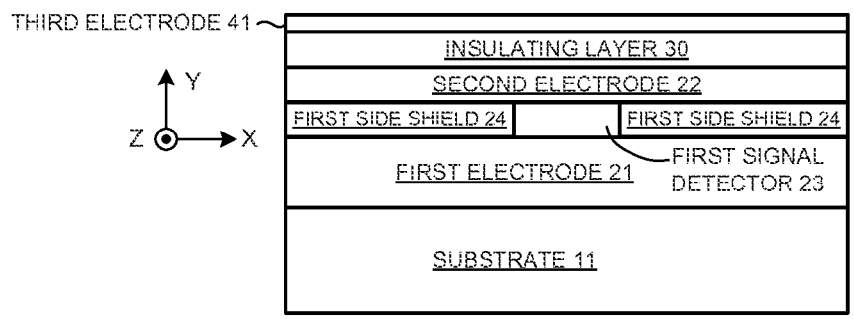

(3) Formation of Second Electrode 22, Insulating Layer 30, and Third Electrode 41 (Step S3, Refer to FIG. 23)

As illustrated in FIG. 23, the second electrode 22, the insulating layer 30, and the third electrode 41 are stacked in sequence on the flat surface made by the first signal detector 23 and the first side shields 24, by, for example, sputtering.

The constituent material of the second electrode 22 is, for example, NiFe. The Y-axis direction thickness of the second electrode 22 is, for example, 20 nm. The constituent material of the insulating layer 30 is, for example, $Al_2O_3$. The Y-axis direction thickness of the insulating layer 30 is, for example, 15 nm. The constituent material of the third electrode 41 is, for example, Cu. The Y-axis direction thickness of the third electrode 41 is, for example, 5 nm.

Figure 24:
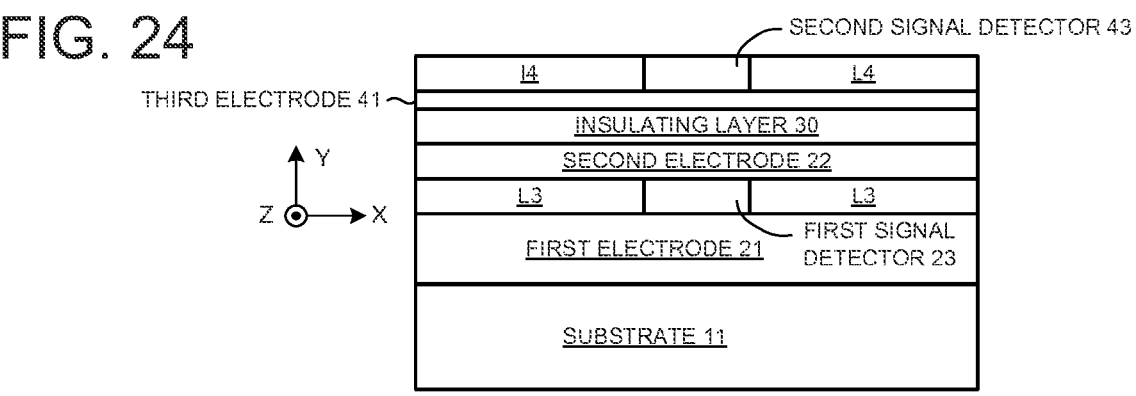

(4) Formation of Second Signal Detector 43 (Step S4, Refer to FIG. 24)

As illustrated in FIG. 24, a film stack which will be the second signal detector 43 is stacked on the third electrode 41 and thereafter a pattern is formed. These steps are the same as the steps in FIG. 14 to FIG. 22, and therefore a detailed description thereof will be omitted.

Figure 25:
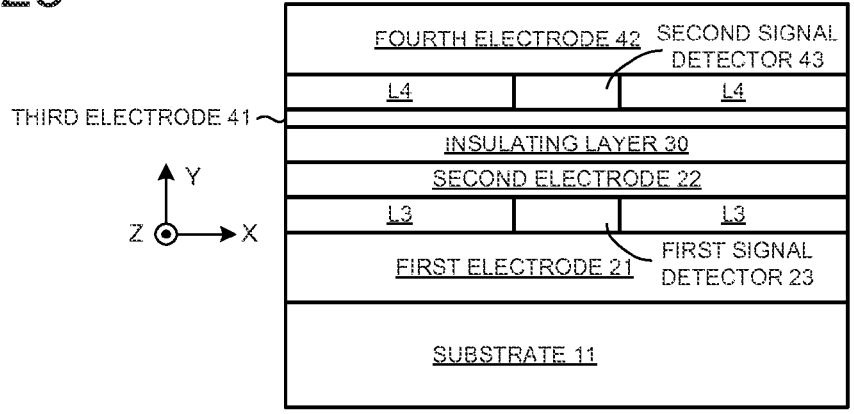

(5) Formation of Fourth Electrode 42 (Step S5, Refer to FIG. 25)

As illustrated in FIG. 25, on the flat surface made by the second signal detector 43 and the second side shields 44, the fourth electrode 42 is formed. The fourth electrode 42 is formed by, for example, electroplating.

The method of manufacturing the magnetic head according to the embodiment described above is only an example and presents only the point. Actually, the manufacturing method thereafter includes a step of forming a write head and steps of cutting a wafer, forming the magnetic recording medium facing surface, and so on by polishing. Conventional manufacturing methods are applicable to these steps. A description of these conventional manufacturing methods will be omitted.

EXAMPLES

Hereinafter, examples will be described.

Example 1

A characteristic of a magnetic head according to an example 1 will be described. A layer structure of the magnetic head according to the example 1 is the same as that of the first embodiment. The layer structure of the magnetic head according to the example 1 is presented in Table 1.

TABLE 1

| Layer structure | Material | Film thickness |
| --- | --- | --- |
| Fourth electrode | NiFe | 1 μm |
| Second signal detector | refer to Table 2 | 26 nm |
| Third electrode | Cu | 5 nm |
| Insulating layer | $Al_2O_3$ | 15 nm |
| Second electrode | NiFe | 20 nm |
| First signal detector | refer to Table 2 | 26 nm |
| First electrode | NiFe | 1 μm |
| First side shield | NiFe | 23 nm |
| Second side shiedl | NiFe | 23 nm |

As each of the first signal detector 23 and the second signal detector 43, the differential magnetoresistive effect element illustrated in FIG. 4A and FIG. 4B is used. A layer structure of each of the first signal detecting par 23 and the second signal detector 43 is presented in Table 2.

TABLE 2

| Layer structure | Material | Film thickness |
| --- | --- | --- |
| Cap layer | Ru | 2 nm |
| Second free layer | NiFe | 4 nm |
| Nonmagnetic layer | Ru | 3 nm |
| First free layer | NiFe | 4 nm |
| Insulating layer | MgO | 1 nm |
| Pin layer | CoPt/Ru/CoFe | 1.5 nm/0.5 nm/1.5 nm |
| Antiferromagnetic layer | IrMn | 6 nm |
| Base layer | Ta/NiCr | 1 nm/1.5 nm |

A positional deviation of the first signal detector 23 and the second signal detector 43 in the X-axis direction in FIG. 1A is substantially 0 nm. The size of each of the four free layers included in the first signal detector 23 and the second signal detector 43 is 35 nm×35 nm.

By using the magnetic head of the example 1, dependence of SNR on a skew angle θ in a 1000 kfci magnetic recording pattern was measured by a spinstand. An applied voltage at the time of the measurement was set to 100 mV both for the first signal detector 23 and the second signal detector 43. A reproduction signal was obtained by synchronizing output waveforms of signals of the first signal detector 23 and the second signal detector 43 by software and combining them.

Comparative Example 1

A characteristic of a magnetic head according to a comparative example 1 will be described. In the magnetic head according to the comparative example 1, TMR elements sandwiched by upper and lower magnetic shields are stacked so as to sandwich an insulating layer as illustrated in FIG. 5. A layer structure of the magnetic head according to the comparative example 1 is presented in Table 3.

TABLE 3

| Layer structure | Material | Film thickness |
| --- | --- | --- |
| Fourth electrode | NiFe | 1 μm |
| TMR2 |  | 26 nm |
| Third electrode | NiFe | 30 nm |
| Insulating layer | Al$_2$O$_3$ | 15 nm |
| Second electrode | NiFe | 30 nm |
| TMR1 |  | 26 nm |
| First electrode | NiFe | 1 μm |
| HB1 | NiFe | 27 nm |
| HB2 | NiFe | 27 nm |

Here, a positional deviation of the two TMR elements in the X-axis direction in FIG. 5 is substantially 0 nm. A layer structure of each of the TMR elements is presented in Table 4.

TABLE 4

| Layer structure | Material | Film thickness |
| --- | --- | --- |
| Cap layer | Ru | 3 nm |
| Free layer | NiFe | 6 nm |
| Insulating layer | MgO | 1 nm |
| Pin layer | CoPt/Ru/CoFe | 2 nm/1 nm/2 nm |
| Antiferromagnetic layer | IrMn | 7 nm |
| Base layer | Ta/NiCr | 2 nm/2 nm |

The size of both free layers included in each of the two TMR elements is 35 nm×35 nm.

As in the example 1, dependence of SNR on a skew angle θ in a 1000 kfci magnetic recording pattern was measured by a spinstand. An applied voltage at the time of the measurement was set to 100 mV as in the example 1. A reproduction signal in the comparative example 1 was also obtained by the software signal processing as in the example 1.

In Table 5, the dependences of SNR on the skew angle θ of the example 1 and the comparative example 1 are compared. It is seen from this that, in the example 1, an effect of reducing white noise, that is, a higher SNR is obtained until the skew angle θ becomes larger, as compared with the comparative example 1, so that increasing recording density is facilitated.

TABLE 5

|  | Skew angle [deg] | | | | |
| --- | --- | --- | --- | --- | --- |
|  | 0 | 1 | 2 | 5 | 10 |
| Example 1 | 14.1 | 13.7 | 13.1 | 12.5 | 12.1 |
| Comparative Example 1 | 14 | 13.1 | 12.3 | 11.2 | 10.6 | unit [dB]

Example 2

Dependence on Material of Nonmagnetic Metal

A characteristic of a magnetic head according to an example 2 will be described. In the example 2, a constituent material (nonmagnetic metal) of a third electrode 41 is changed. Table 6 presents the constituent material of the third electrode 41.

TABLE 6

| Material | Film thickness |
| --- | --- |
| Au | 5 nm |
| Ag | 5 nm |
| W | 5 nm |
| Mo | 5 nm |
| Ru | 5 nm |
| CuRu | 5 nm |
| CuAu | 5 nm |
| CuAg | 5 nm |
| CuW | 5 nm |
| CuMo | 5 nm |

A positional deviation of a first signal detector 23 and a second signal detector 43 in the X-axis direction in FIG. 1A is substantially 0 nm as in the example 1. The size of free layers included in the first signal detector 23 and the second signal detector 43 is also 35 nm×35 nm as in the example 1.

In the example 2 as well, dependence of SNR on a skew angle θ was measured as in the example 1.

Comparative Example 2

Case where Nonmagnetic Metal is NiFe (5 nm)

A characteristic of a magnetic head according to a comparative example 2 will be described. In the comparative example 2, a constituent material (nonmagnetic metal) of a third electrode 41 is NiFe (5 nm).

In the comparative example 2 as well, dependence of SNR on a skew angle θ was measured as in the example 2. However, in the comparative example 2, a disconnection occurred in a second signal detector 43 side when an applied voltage was 100 mV, and a signal could not be obtained.

In Table 7, the dependences of SNR on the skew angle θ of the example 2 and the comparative example 2 are presented in a comparative manner. This shows effectiveness of the material of the third electrode 41 of the example 2.

TABLE 7

|  |  | Skew angle [deg] | | | | |
| --- | --- | --- | --- | --- | --- | --- |
|  | Material | 0 | 1 | 2 | 5 | 10 |
| Example 2 | Au | 13.8 | 13.6 | 13.2 | 12.3 | 12.4 |
|  | Ag | 13.9 | 13.3 | 13 | 12.3 | 12.4 |
|  | W | 13.9 | 13.5 | 13.1 | 12.4 | 12.3 |
|  | Mo | 14 | 13.4 | 13.1 | 12.6 | 12.4 |
|  | Ru | 14.1 | 13.2 | 13.2 | 12.2 | 12.1 |
|  | CuRu | 14 | 13.8 | 13.3 | 12.1 | 12.1 |
|  | CuAu | 13.7 | 13.3 | 13 | 12.4 | 12.2 |
|  | CuAg | 13.9 | 13.2 | 13 | 12.7 | 12.4 |
|  | CuW | 13.8 | 13.3 | 12.8 | 12.1 | 12.4 |
|  | CuMo | 13.8 | 13.3 | 12.9 | 12.3 | 12.3 |
| Comparative Example 2 | NiFe | unmeasurable | unmeasurable | unmeasurable | unmeasurable | unmeasurable | unit [dB]

Example 3

Case where Second Electrode 22 and Third Electrode 41 are Both Nonmagnetic Metals A characteristic of a magnetic head according to an example 3 will be described. A layer structure of the magnetic head according to the example 3 is the same as that of the second embodiment and is presented in Table 8.

TABLE 8

| Layer structure | Material | Film thickness |
|---|---|---|
| Fourth electrode | NiFe | 1 μm |
| Second signal detector | refer to Table 2 | 26 nm |
| Third electrode | Cu | 5 nm |
| Insulating layer | $Al_2O_3$ | 15 nm |
| Second electrode | NiFe | 5 nm |
| First signal detector | refer to Table 2 | 26 nm |
| First electrode | NiFe | 1 μm |
| First side shield | NiFe | 23 nm |
| Second side shiedl | NiFe | 23 nm |

As each of the first signal detector 23 and the second signal detector 43, the magnetoresistive effect element illustrated in the example 1 is used. A layer structure of each of the first signal detector 23 and the second signal detector 43 is presented in Table 2.

A positional deviation of the first signal detector 23 and the second signal detector 43 in the X-axis direction in FIG. 7A is substantially 0 nm as in the example 2. The size of four free layers included in the first signal detector 23 and the second signal detector 43 is 35 nm×35 nm.

By using the magnetic head of the example 3, dependence of SNR on a skew angle θ in a 1000 kfci magnetic recording pattern was measured by a spinstand. An applied voltage at the time of the measurement was set to 100 mV both for the first signal detector 23 and the second signal detector 43. A reproduction signal was obtained by synchronizing output waveforms of signals of the first signal detector 23 and the second signal detector 43 by software and combining them.

In Table 9, the dependences of SNR on the skew angle θ of the example 3 and the comparative example 1 are compared. It is seen from this that, in the example 3, an effect of reducing white noise, that is, a higher SNR is obtained until the skew angle θ becomes larger, as compared with the comparative example 1, so that increasing recording density is facilitated.

TABLE 9

| | Skew angle [deg] | | | | |
|---|---|---|---|---|---|
| | 0 | 1 | 2 | 5 | 10 |
| Example 3 | 14 | 13.8 | 13.5 | 13.1 | 12.8 |
| Comparative Example 1 | 14 | 13.1 | 12.3 | 11.2 | 10.6 | unit [dB]

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
   a first electrode of a magnetic body having a magnetic shielding property;
   a first signal detector disposed on the first electrode and being a differential magnetoresistive effect element;
   a second electrode disposed on the first signal detector;
   an insulating layer disposed on the second electrode;
   a third electrode disposed on the insulating layer;
   a second signal detector disposed on the third electrode and being a differential magnetoresistive effect element; and
   a fourth electrode of a magnetic body disposed on the second signal detector, having a magnetic shielding property,
   at least one of the second electrode and the third electrode being a nonmagnetic metal.

2. The magnetic head of claim 1,
   wherein at least one of the second electrode and the third electrode is a nonmagnetic metal layer having a thickness of not less than 3 nm nor more than 20 nm.

3. The magnetic head of claim 1,
   wherein the other of the second electrode and the third electrode is a magnetic metal layer having a thickness of not less than 10 nm nor more than 60 nm.

4. The magnetic head of claim 1,
   wherein both of the second electrode and the third electrode are nonmagnetic metals each having a thickness of not less than 3 nm nor more than 20 nm.

5. The magnetic head of claim 1,
   wherein the nonmagnetic metal contains at least one of Cu, Au, Ag, W, Mo, and Ru.

6. The magnetic head of claim 1,
   wherein the first signal detector and the second signal detector each have a nonmagnetic layer and a pair of free layers disposed on both sides of the nonmagnetic layer, each free layer having a magnetization direction which is changeable.

7. The magnetic head of claim 1, further comprising:
   a fifth electrode disposed on the insulating layer;
   a third signal detector disposed on the fifth electrode and being a differential magnetoresistive effect element;
   a sixth electrode disposed on the third signal detector; and
   a second insulating layer disposed on the sixth electrode,
   at least one of the fifth electrode and the sixth electrode being a nonmagnetic metal.

8. The magnetic head of claim 7,
   wherein the other of the fifth electrode and the sixth electrode is a magnetic body having a magnetic shielding property.

9. The magnetic head of claim 7,
   wherein both of the fifth electrode and the sixth electrode are nonmagnetic metals.

10. A magnetic recording and reproducing apparatus comprising:
    the magnetic head of claim 1; and
    a signal computing unit which outputs a read signal by a combination operation of signals output from the first signal detector and the second signal detector.

11. A method of manufacturing a magnetic head comprising:
    forming a first signal detector being a differential magnetoresistive effect element, on a first electrode being a magnetic body having a magnetic shielding property;
    forming a second electrode on the first signal detector;
    forming an insulating layer on the second electrode;
    forming a third electrode on the insulating layer;
    forming a second signal detector being a differential magnetoresistive effect element, on the third electrode; and
    forming a fourth electrode being a magnetic body having a magnetic shielding property, on the second signal detector,
    at least one of the second electrode and the third electrode being a nonmagnetic metal.

12. The method of claim 11,
wherein at least one of the second electrode and the third electrode is a nonmagnetic metal layer having a thickness of not less than 3 nm nor more than 20 nm.

13. The method of claim 11,
wherein the other of the second electrode and the third electrode is a magnetic metal layer having a thickness of not less than 10 nm nor more than 60 nm.

14. The method of claim 11,
wherein both of the second electrode and the third electrode are nonmagnetic metals each having a thickness of not less than 3 nm nor more than 20 nm.

15. The method of claim 11,
wherein the nonmagnetic metal contains at least one of Cu, Au, Ag, W, Mo, and Ru.

16. The method of claim 11,
wherein the first signal detector and the second signal detector each have a nonmagnetic layer and a pair of free layers disposed on both sides of the nonmagnetic layer, each free layer having a magnetization direction which is changeable.

17. The method of claim 11, further comprising:
forming a fifth electrode on the insulating layer;
forming a third signal detector on the fifth electrode and being a differential magnetoresistive effect element;
forming a sixth electrode on the third signal detector; and
forming a second insulating layer on the sixth electrode,
at least one of the fifth electrode and the sixth electrode being a nonmagnetic metal.

18. The method of claim 17,
wherein the other of the fifth electrode and the sixth electrode is a magnetic body having a magnetic shielding property.

19. The method of claim 17,
wherein both of the fifth electrode and the sixth electrode are nonmagnetic metals.

* * * * *